United States Patent [19]
Imura et al.

[11] Patent Number: 5,369,756
[45] Date of Patent: Nov. 29, 1994

[54] FAULT TREE DISPLAYING METHOD AND PROCESS DIAGNOSIS SUPPORT SYSTEM

[75] Inventors: Yoshihiko Imura; Akira Kaji; Takekazu Maruyama, all of Hitachi, Japan

[73] Assignee: Hitachi, Ltd., Tokyo, Japan

[21] Appl. No.: 642,892

[22] Filed: Jan. 18, 1991

[30] Foreign Application Priority Data

Jan. 18, 1990 [JP] Japan .................................. 2-9044

[51] Int. Cl.$^5$ .............................................. G06F 11/00
[52] U.S. Cl. ................................ 395/575; 371/29.1; 395/914; 395/916
[58] Field of Search ................ 371/29.1, 16.5, 15.1; 395/153, 155, 156, 157, 575, 911, 912, 914, 916

[56] References Cited

U.S. PATENT DOCUMENTS

| | | | |
|---|---|---|---|
| 4,571,679 | 2/1986 | Russell et al. | 395/575 |
| 4,632,802 | 12/1986 | Herbst et al. | 395/915 |
| 4,712,191 | 12/1987 | Penna | 364/900 |
| 4,763,356 | 8/1988 | Day, Jr. et al. | 395/155 |
| 4,794,386 | 12/1988 | Bedrij et al. | 395/157 |
| 4,862,390 | 8/1989 | Weiner | 395/155 |
| 4,916,699 | 4/1990 | Ohashi | 371/29.1 |
| 4,920,514 | 4/1990 | Aoki | 395/156 |
| 5,023,045 | 6/1991 | Watanabe et al. | 395/914 |
| 5,045,880 | 9/1991 | Evanitsky et al. | 395/155 |
| 5,065,338 | 11/1991 | Phillips et al. | 395/51 |
| 5,099,436 | 3/1992 | McCown et al. | 395/911 |
| 5,187,773 | 2/1993 | Hamilton et al. | 395/911 |
| 5,239,487 | 8/1993 | Horejsi et al. | 395/916 |

*Primary Examiner*—Charles E. Atkinson
*Attorney, Agent, or Firm*—Antonelli, Terry, Stout & Kraus

[57] ABSTRACT

In a system which performs an inference based on fault tree knowledge, a guidance and a formula of definition can be displayed in a window on a CRT display screen by selecting the individual items from a fault tree on the display screen by using, for example, a soft key. For displaying an abnormal course in one display screen, only events relevant to the abnormal course is picked up, and the fault tree is then reedited, so that the reedited fault tree can be automatically displayed on the display screen.

13 Claims, 17 Drawing Sheets

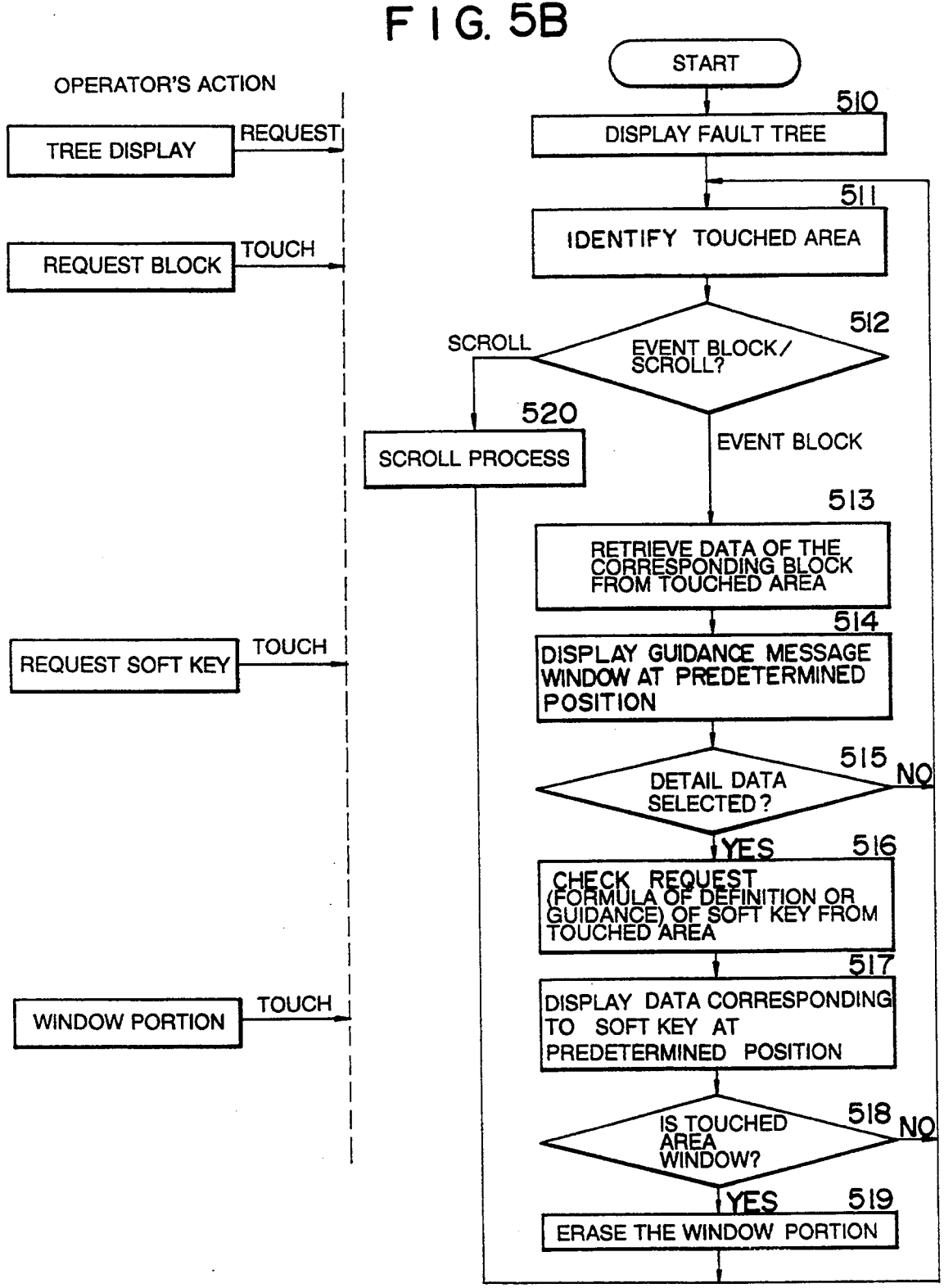

ALARM SUMMARY

FAULT TREE DISPLAY CHART

FAULT TREE DISPLAYING METHOD AND PROCESS DIAGNOSIS SUPPORT SYSTEM

BACKGROUND OF THE INVENTION

1. Field of the Invention

This invention relates generally to a support system for assisting a process diagnosis, and more particularly to a displaying method for performing suitable fault tree display and a process diagnosis support system utilizing the displaying method.

2. Description of the Related Art

Existing power plants, for example, are equipped with a diagnosis support system for assisting an operator to investigate the cause of an abnormal event and to adopt a proper measure.

In this kind of diagnosis support system, an operator investigates the cause of an abnormal event on reference to a fault tree previously created. Specifically, for a fault tree, various possible abnormalities and causes thereof are stored in a memory medium beforehand as one lot of related structural data in such an order as to systematically show their relevant events as well as flows of causal relations; if an abnormality is detected, a fault tree including a portion where the abnormality occurred is retrieved and then is displayed for an operator's review.

The prior technology concerning the construction of this kind of fault tree is exemplified by Japanese Patent Laid-Open Publication 199296/1989.

For an operator to perform monitoring and to adopt a proper measure on a possible abnormality by a fault tree having been created, it preferably is needed to find out a necessary event accurately and quickly and also to recognize the event in greater detail easily. More particularly at the occurrence of an abnormality, a quick and error-free measure is needed and, for this reason, a variety of ideas have hitherto been proposed.

For example, a proposal has been made in which every individual event can be displayed locally on an enlarged scale from a fault tree illustrating the entire construction. According to another proposal, an abnormal course or path is displayed in a different color on a fault tree so that discovery of such an abnormal portion and investigation of a cause of the abnormality can be performed with ease.

This kind of prior art is exemplified by Japanese Patent Laid-Open Publications 121409/1983, 199296/1989, 42535/1990 and 129405/1988. In addition, diagnostic technology utilizing a fault tree is disclosed in, for example, an article "Pump plant failure diagnostic system" in a publication "Technical Journal of Mitsubishi Heavy Industries", Vol. 26, pages 91-95, and Japanese application 102935/1988.

SUMMARY OF THE INVENTION

It is therefore a first object of this invention to provide a convenient fault tree displaying method and a process diagnosis support system, in which detailed data on each event of a fault tree can be consulted with, along with the entire fault tree, without switching the display screen.

A second object of the invention is to provide a reliable fault tree displaying method and a process diagnosis support system, in which even a large-scale fault tree can be recognized at a glance without switching the display screen, thus preventing an operator from making a wrong judgment.

A third object of the invention is to provide a plain fault tree displaying method and a process diagnosis support system, in which a relevant event would not disappear from the display screen even when the display is scrolled, thus making the display easy to see.

A fourth object of the invention is to provide a plain fault tree displaying method and a process diagnosis support system, in which a summary of relevant events with a particular event at the center of the summary can be displayed.

The first object of the invention can be accomplished by providing detailed data relevant and corresponding to respective events of a fault tree to be displayed on a display screen and then displaying, upon acceptance of an operator's action to designate one of the displayed events, the detailed data corresponding to the designated event within a window at a remaining area on the same display screen, on which the entire fault tree is displayed.

The second object of the invention can be accomplished by calculating the degree of abnormality, then selecting an event whose degree of abnormality is over a predetermined value, constructing a fault tree regarding the selected event, and displaying the constructed tree.

The third object of the invention can be accomplished by storing in a stage means the content of display regarding an event which would disappear from the display screen when scrolled, then reconstructing a fault tree including the stored event after scrolling, and finally displaying the reconstructed fault tree.

The fourth object of the invention can be accomplished by locating a particular event centrally of its hierarchy on the display screen and arranging other peripheral events around the particular event.

According to this invention, there is provided a process diagnosis support system comprising: a database in which signals from a process are stored; a knowledge base in which knowledge including a fault tree to be used in inferring is stored; and inference processing means for performing an inference including monitoring the process and retrieving the fault tree by using the database and knowledge base; an inference result storing means for storing the result of the inference; a display processing means for displaying the result of the inference on a display screen of a display; and at least one of the following functions:

(i) a first function of providing detailed data relevant and corresponding to respective possible events of a fault tree to be displayed on a display screen, and displaying, upon receipt of an designation for at least one of the events, in a window its relevant and corresponding detailed data on the display screen in a remaining area thereof so as not to interfere with observation of the fault tree;

(ii) a second function of calculating the degree of abnormality for each of various possible events of a fault tree, selecting one or more events whose degree of abnormality exceeds a predetermined value, constituting a new fault tree by the selected events, and displaying the new fault tree on the display screen;

(iii) a third function of storing in a storage means the content of a display concerning one or more events which will overflow from the display screen when scrolling is performed in connection with the fault tree displayed on the display screen, reconstituting, after scrolling, the fault tree by including the stored events, and displaying the reconstituted fault tree; and (iv) locating a particular event centrally of its associated hierarchy on the display screen, and arranging other peripheral events around the particular event.

With the foregoing arrangement, since the individual events of a fault tree to be displayed on the display screen correspond to the respective relevant detailed data, it is possible to specify necessary detailed data by designating the event.

Further, regarding an arbitrary event of a fault tree to be displayed on the display screen, upon acceptance of a designation from an operator, the detailed data corresponding to the designated event is fetched out and is then displayed on the display screen. At that time, displaying is performed by providing a window at a remaining area which does not interfere with observing the fault tree. This remaining area may be located, for example, at the upper event side of the tree.

Only by designating a desired event of the displayed tree, an operator can observe the detailed data relevant to the designated event on the same display screen where the tree is displayed. Therefore, this invention would require no laborious operation and hence convenient especially in consulting with the detailed data, such as a formula of definition and a guide message, concerning each individual event of the tree. In addition, since any arbitrary relevant detailed data can be displayed simultaneously with the fault tree, investigation of the cause of an abnormality can be facilitated.

Also, an abnormal course or path, which is connected at least to one abnormal event, can be automatically selected by calculating the degree of abnormality for every event of the tree and selecting the event whose degree of abnormality is higher than a predetermined value. The fault tree can be reedited by linking the thus selected events.

Since only the event whose degree of abnormality is over a predetermined value is selected to reedit the fault tree, the fault tree can be constructed regarding only the abnormal course or path even in case of large-scale process. It is therefore possible to reduce the scale of the tree itself so as to be easily accommodated in a single display screen. As a consequence, an operator can observe a necessary portion of the tree without switching the display screen and hence can recognize the abnormality quickly and securely.

Additionally, regarding the event to disappear from the display screen as the fault tree is scrolled, the content of display is stored and preserved in storage. After scrolling, the content of display regarding the event disappeared from the display screen is read from the storage and then is reconstructed together with the displayed events, whereupon the fault tree is reedited and displayed.

For this feature, even when a fault tree is scrolled on the display screen, the relevant event would not disappear from the display screen so that any necessary event can be recognized without scrolling the display screen repeatedly, thus guaranteeing a plain and hence easy-to-see display.

Likewise, a particular event can be located centrally of its hierarchy on the display screen, and other peripheral events can be arranged around the particular event. Since the abnormal course or path as well as its relevant events can be arranged on the common display screen with the former at the screen center, it is convenient to an operator in investigating the cause of abnormality.

Thus the system according to this invention is easy to operate and convenient to use; any necessary event can always be seen so that an operator can make an accurate and quick judgment on the casual relation.

BRIEF DESCRIPTION OF THE DRAWINGS

FIG. 5B is a flowchart showing details of the fault tree display process of FIG. 5A;

DETAILED DESCRIPTION OF THE EMBODIMENTS

Figure 1:
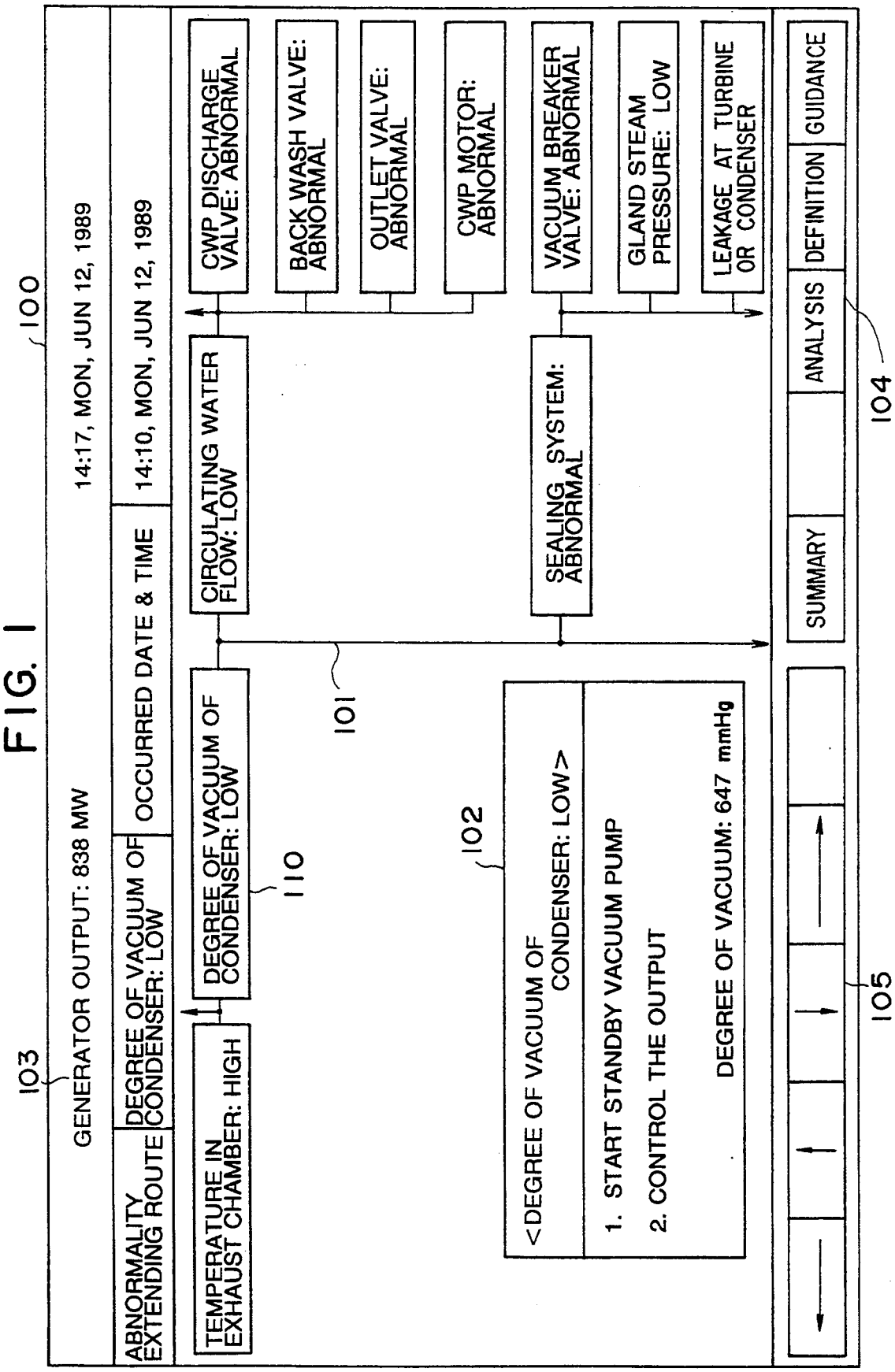
FIG. 1 is a diagram showing an example of display, on a display screen, in a fault tree displaying method according to one embodiment of this invention.

The principles of this invention are particularly useful when embodied in a fault tree displaying method. FIG. 1 shows an example of display screen to be created by adopting one embodiment of the fault tree displaying method.

As shown in FIG. 1, a display screen 100 displays: a particular data display portion 103 for data specifying a process displayed on the display screen and also for data concerning the current time, an abnormal event of a fault tree being displayed, etc; a fault tree 101 including the abnormal event; a window 102 in which detailed data concerning a designated event is to be displayed; a selection designating potion 104 in which a selection menu for the displayed item is displayed; and a scroll designating portion 105 for designating scrolling of the display screen.

The individual event blocks 110 constituting the fault tree 101, the selection designating portion 104 and the scroll designating portion 105 respectively constitute soft keys by which their predetermined area are designated to select or execute the contents corresponding to the respective areas. Inputting to these soft keys, in the illustrated embodiment, is performed by using a touch panel as described below. However, this invention should by no means be limited to this specific form; alternatively, a position designating means such as a mouse, a keyboard or the like may be used.

In the window 102, guidance data such as a guidance message is displayed. In the example of FIG. 1, since an event "the degree of vacuum of a condenser: low" is selected, the guidance message such as a proper measure concerning it as well as the state of its related plant are displayed.

Figure 2A:
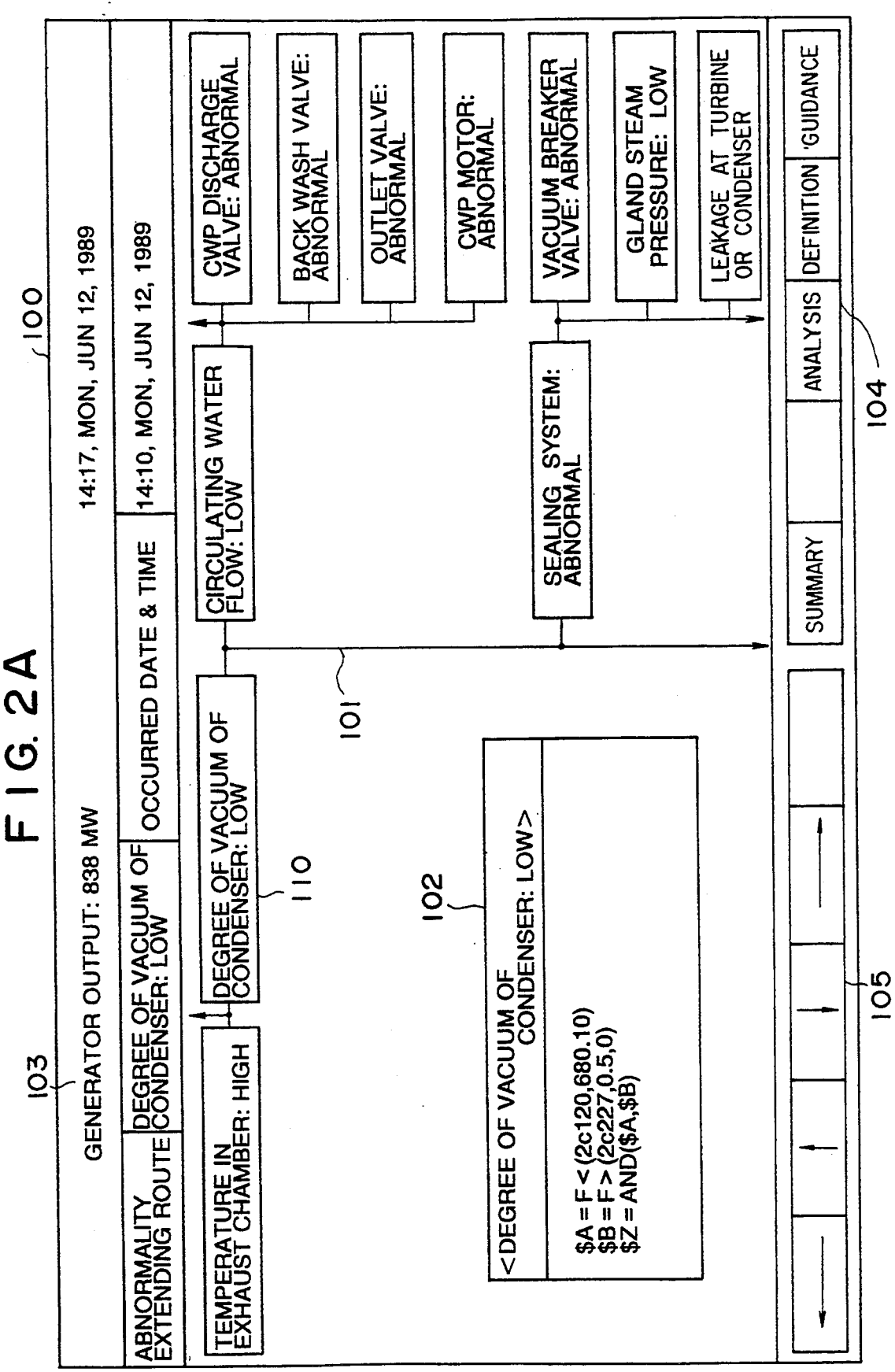
FIGS. 2A, 2B and 2C are diagrams similar to FIG. 1, showing various different examples of display on a display screen.

FIG. 2A shows a display screen similar to that of FIG. 1, except the content of display within the window 102.

In the example of FIG. 2A, the guidance message, here a formula of definition, is displayed within the window 102. This display is what has been switched from the guidance message by touching the soft key where "definition" was displayed at the selection designating portion 104.

In this embodiment, in normal state, the guidance message is displayed; alternatively, in normal state, the formula of definition may be displayed.

Figure 2B:
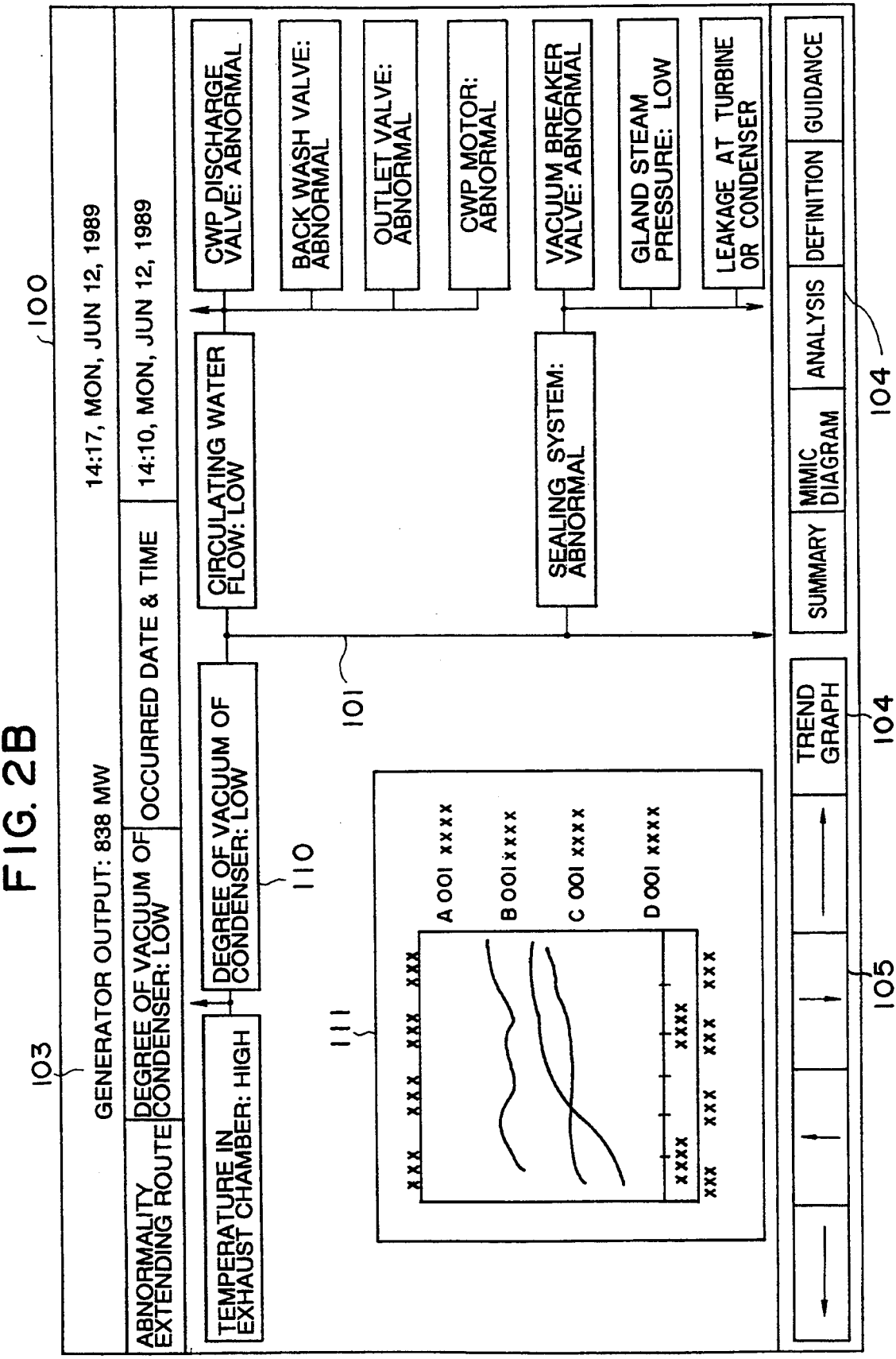
Figure 2C:
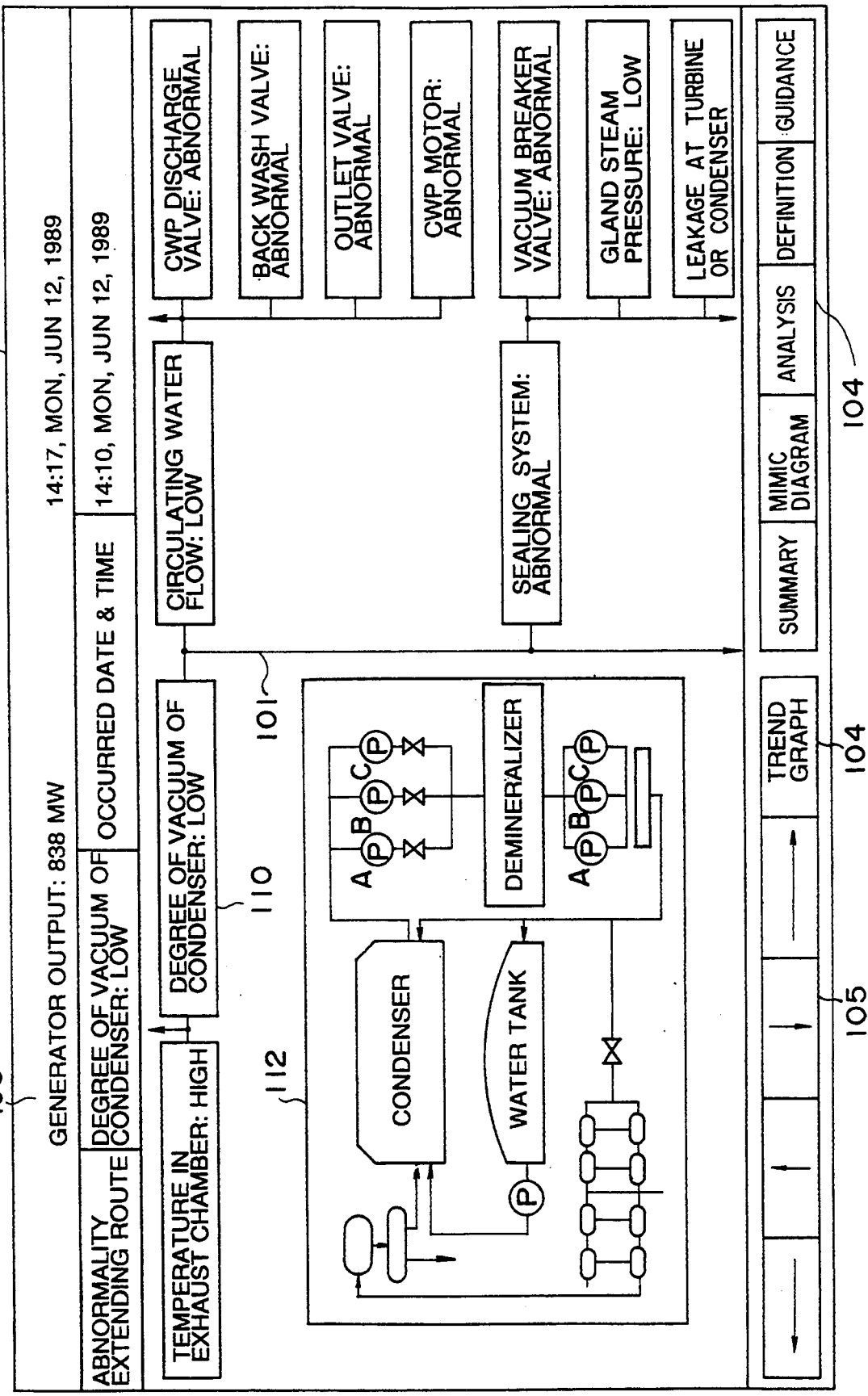

Further, it is possible to simultaneously display a trend graph and a mimic diagram concerning each event. Namely, FIG. 2B shows the mode of display in which a trend graph 111 is displayed within the window, while FIG. 2C shows the mode of display in which a mimic diagram 112 is displayed within the window. Now if an operator touches a "trend graph" on the associated soft key at the selection designating portion 104, the display of FIG. 2B comes out on the display screen. Likewise, if an operator touches a "mimic diagram" on the associated soft key at the selection designating portion 104, the display of FIG. 2C comes out on the display screen.

Figure 3A:
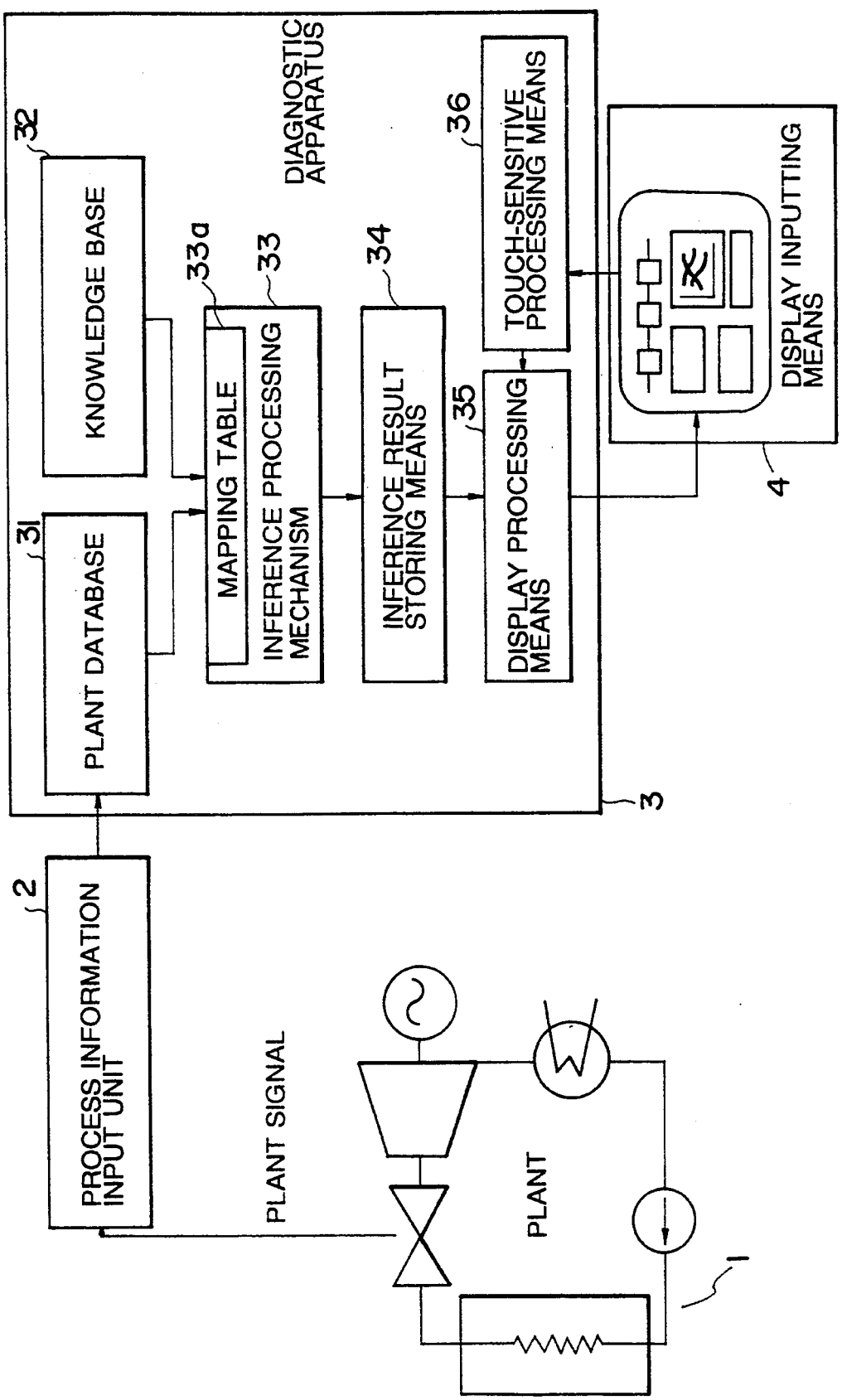
FIG. 3A is a block diagram showing one example of a plant diagnosis support system adopting the fault tree displaying method.
Figure 3B:
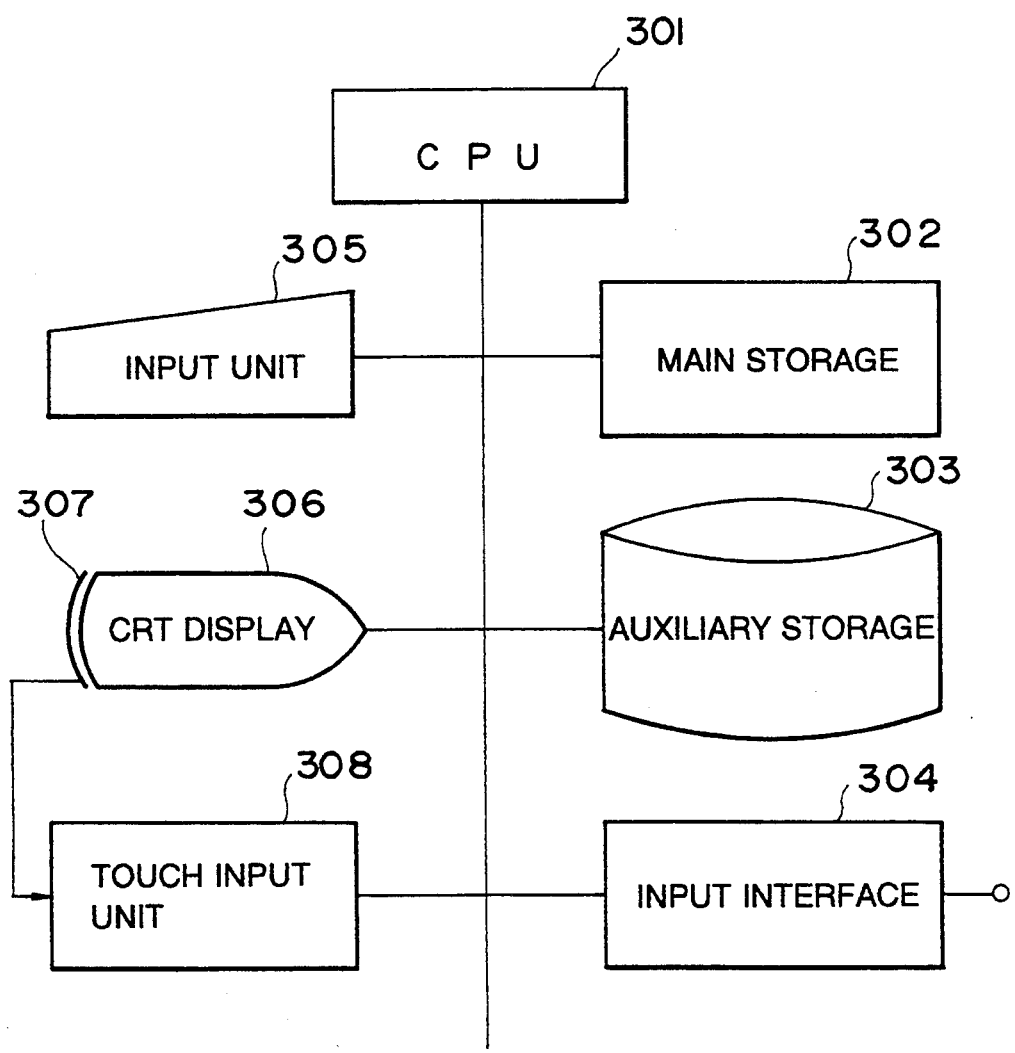
FIG. 3B is a block diagram showing the hardware of a diagnostic apparatus and a display inputting unit in the plant diagnosis support system of FIG. 3A.
Figure 4:
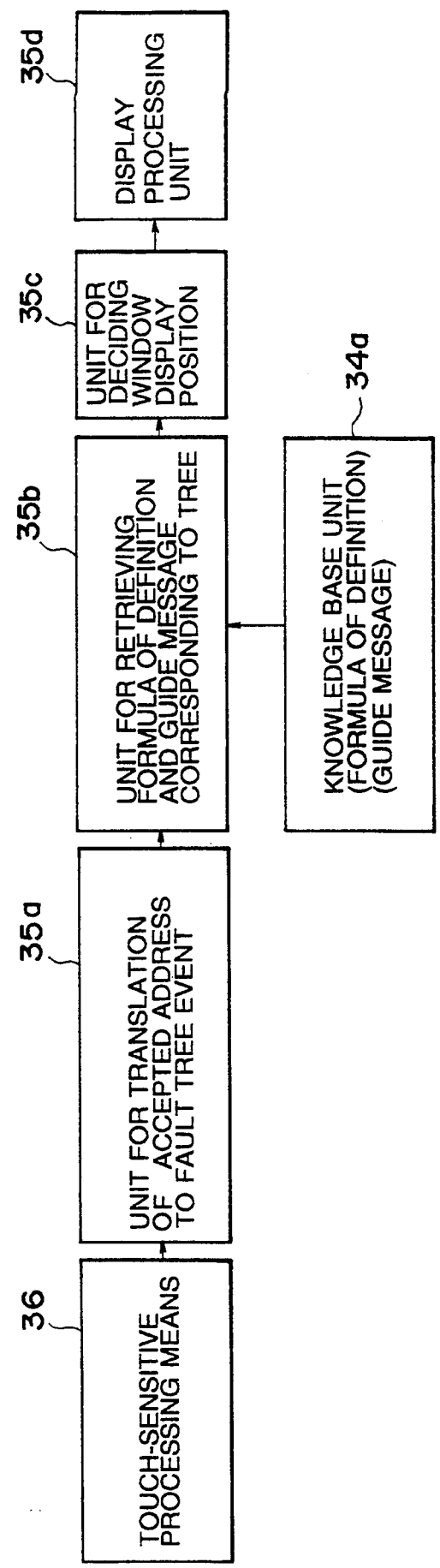
FIG. 4 is a block diagram showing a portion of the function of a display processing means constituting a part of the plant diagnosis support system.

FIGS. 3A, 3B and 4 shows a process diagnosis support system adopting the foregoing fault tree displaying method.

The process diagnosis support system of FIG. 3A is a system for assisting in making a diagnosis on an abnormality or fault of a power plant 1. This support system generally comprises: a process information inputting unit 2 for fetching periodically from a sensor a signal indicating the status of an individual portion of the plant 1 which portion is to be monitored, for converting the fetched signal into a digital value as well as into an engineering unit value; a diagnostic apparatus 3 for making a diagnosis on the status of the plant 1 by using plant database (described below), in which various kinds of plant signals outputted from the process information inputting unit 2 and indicating the status of a process are stored, and knowledge base (described below) previously constituted; and a display inputting means 4 for displaying the result of diagnosis and inputting an instruction or the guidance message.

The diagnostic apparatus 3, as shown in FIG. 3A, includes, for example, plant database 31, knowledge base 32, an inference processing mechanism (inference processing means) 33 for making an inference by using the plant database 31 and the knowledge base 32, an inference result storing means 34 for storing the result of an inference, a display processing means 35 for performing a process so as to indicate the result of an inference, and a touch-sensitive processing means 36 for performing a process in response to a touch input from the display inputting means 4.

The plant database 31 stores plant signals, as plant data, according to predetermined addresses to which code numbers for managing their respective monitoring points are allotted.

In the knowledge base 32, expert knowledge for use in making a diagnosis on the status of the plant by using plant signals, a previously constituted fault tree, and detailed data, such as the formula of definition and the guidance message, corresponding to an individual event of the tree are stored in the language of fact-type knowledge, rule-type knowledge, etc.

The inference processing mechanism 33 is provided with a mapping table 33a for taking the mutual relation between the knowledge stored in the knowledge base, the plant data and the individual event data. The inference processing mechanism 33 also has a function for making the diagnosis on the status of the plant and selecting, at the occurrence of an abnormality, a corresponding fault tree, by consulting with the mapping table 33a and the knowledge base.

The inference result storing means 34 stores the result of an inference, a fault tree selected at the occurrence of an abnormality and its detailed data. The detailed data, as described above, includes the guidance message, the formula of definition, etc. In the inference result storing means 34, in order to constitute a knowledge base portion (34a in FIG. 4), a common identification code is allotted to the detailed data for every event of the fault tree. The content of data, such as the guidance message and the formula of definition, are allotted hierarchically with codes. For these codes, a table should be provided to show their mutual relationships.

These codes may be in the form of storage addresses. If the codes are not storage addresses, a table should be provided to show associated storage addresses.

The touch-sensitive processing means 36 has, for example, a function for converting, upon receipt of a touch input signal from a touch input unit (described below), a position, which is indicated by the input signal, into an address on the display screen and accepting such address data as the position. Then the converted address data is transferred to the display processing means 35.

The display processing means 35, as shown in FIG. 4, includes a conversion processing portion 35a for converting, upon receipt of the address data, the accepted address into a managing number indicating the event of a fault tree, a retrieving portion 35b for retrieving, by using the managing number as a key, detailed data regarding the event designated from the knowledge base portion 34a, a window-display-position deciding portion 35c for deciding the position in which the window 102 is to be displayed, and a display processing portion 35d for performing data processing so as to display the data, including the window, on the display screen as shown in FIG. 1.

The conversion processing unit 35a has a function for discriminating as to which the individual event block 110, the selection designating portion 104 or the scroll designating portion 105, as shown in FIG. 1, the accepted address is allotted to, and also a function for converting, in case of the event block 110, the accepted address into a managing number indicating the event.

The retrieving portion 35b has a function for detecting the presence of an instruction to the selection designating portion 104, then interpreting the content of the instruction, if present, and discriminating as to which the formula of definition or the guidance message the content requested to be displayed within the window 102 is, and a function for considering the result of the discrimination, retrieving, by using the managing number as a key, detailed data concerning the designated event and to be stored at the knowledge base portion 34a, and fetching out the relevant data.

The window-display-position deciding portion 35c has a function for inspecting the arrangement of the display screen processed and displayed by the display processing portion 35d and extracting the area devoid of the fault tree 101, and a function for providing the window 102 at the extracted area.

FIG. 3B shows one example of hardware systems of the diagnostic apparatus 3, which constitutes the diagnosis support system of the illustrated embodiment, and of the display inputting means 4.

The hardware system used in this embodiment includes: a central processing unit (CPU) 301 for performing, according to a program, the function of each of the inference processing mechanism 33, the display processing means 35, the touch-sensitive processing means 36, etc., the processing of various kinds of data such as data input and output processing, the control of storage, and the controlling of the system; main storage 302 for storing the program and various kinds of data; auxiliary storage 303 for storing the program and data; an input interface 304 for accepting input data from, for example, the process information inputting unit 2; an input unit 305 such as a keyboard for inputting data and instructions; a CRT display 306 for displaying, for example, a fault tree as the result of inference; a touch-sensitive panel 307 arranged on the display surface of the CRT display 306; and a touch input unit 308 for detecting the designated position based on the touched information from the touch-sensitive panel 307. In addition, other machines or apparatuses such as a printer may be connected to the system.

Figure 6:
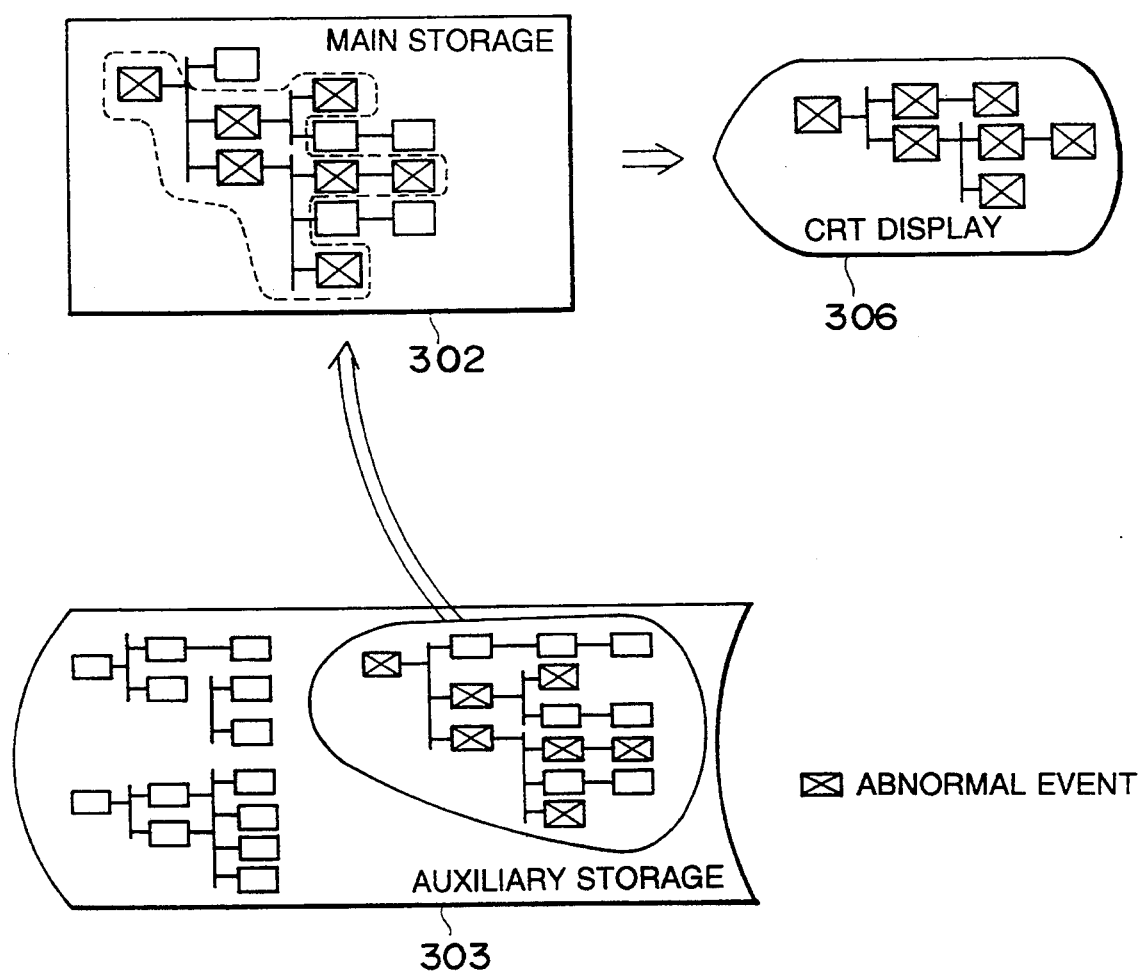
FIG. 6 shows the general manner in which one fault tree is selected from a group of fault trees and is edited.

In the main storage 302, data of the plant database 31, the knowledge base 32, the inference result storing means 34, etc., and various tables such as the mapping table 33a are stored as data. Since the knowledge base 32 to be stored in the main storage 302 is a massive amount and is not always used at the same time, only a needed range of the knowledge base 32 may be stored in the main storage 302. For example, many precreated fault trees are stored in the auxiliary storage 303 as shown in FIG. 6; in the presence of an abnormality, a necessary tree is retrieved by the inference processing mechanism 33 and is then stored in the main storage 302.

The input unit 305, the CRT display 306, the touch-sensitive panel 307 and the touch input unit 308 jointly constitute the display inputting means 4.

In this embodiment, the display is in the form of a cathode ray tube (CRT). However, this invention should by no means be limited to this specific example, and for example, it may be a liquid crystal display, a plasma display, etc.

The structures of the plant database 31 and the knowledge base 32 to be used in this embodiment will now be described with reference to FIG. 7, whereupon the mode operation of the embodiment also will be described.

Various possible fault trees to be used in this embodiment are created in the illustrated or other data processing system. To define a fault tree on the display screen of a CRT display 701, every event uses an input point number, as a managing number, representing plant data. Knowledge base 703 and plant database 702 are linked with each other by a mapping table 704. If each individual event is defined on the CRT screen, such information will be automatically obtained, thus automatically generating the mapping table 704.

The plant database 31 is capable of storing data corresponding to individual input points, for example, as follows:

---

MS001 (DEGREE OF VACUUM) ___mmHg
MS002 (MAIN STEAM TEMPERATURE) ___°C.
.
.
.
MS010 (GENERATOR OUTPUT) ___MW
.
.
.

---

Figure 7:
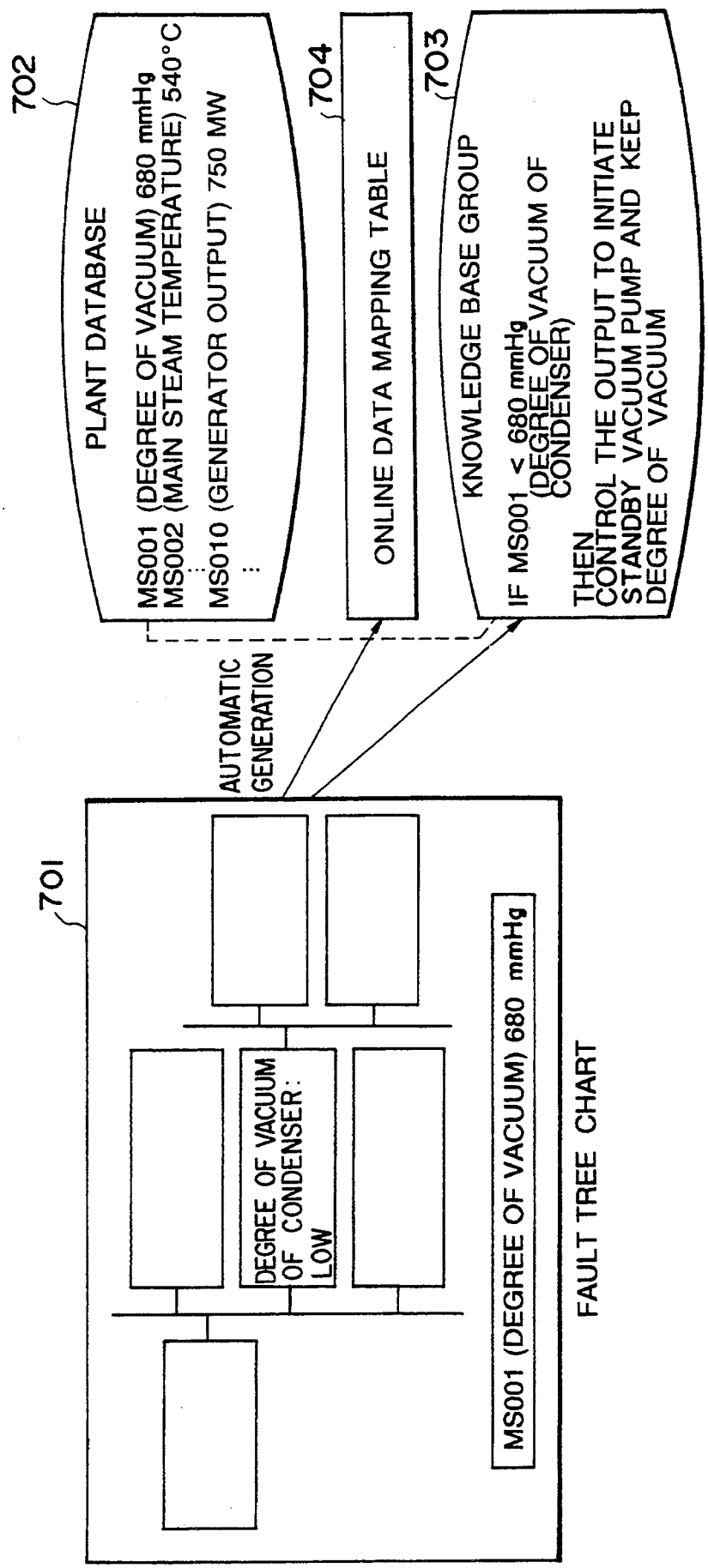
FIG. 7 generally shows an example of construction of plant database and knowledge base to be used in the illustrated embodiment.

In FIG. 7, numerical values are written in; these numerical values are fetched periodically from the plant or are obtained from the plant only at the time of making a diagnosis.

On the other hand, the knowledge base 32 defines a judgment condition and its proper measure concerning data associated with each input point, for example, in the following rule:

---

IF MS001 < 680 mmHg,
THEN CONTROL THE OUTPUT TO INITIATE STANDBY VACUUM PUMP AND KEEP DEGREE OF VACUUM.

---

This rule is created based on knowhow, knowledge, which are owned by plant makers and experts such as experienced operators.

Also, in the knowledge base 32, many fault trees to be created according to the kinds of abnormalities are stored.

Then, the plant database and the knowledge base are stored in the auxiliary storage 303, and are arranged on the main storage 302 when the system is initiated, thus realizing a diagnosis support system.

Figure 5A:
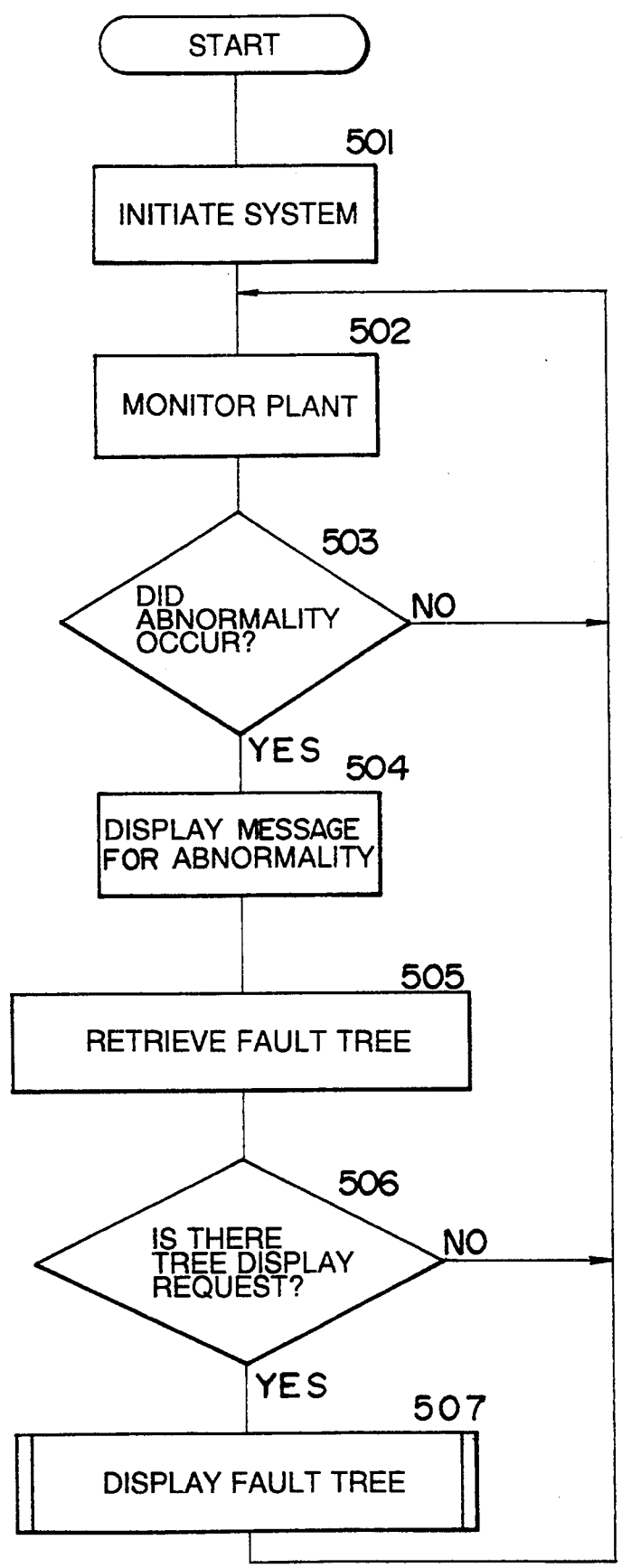
FIG. 5A is a flowchart showing the flow of inference operation of the plant diagnosis support system.

In operation, as shown in FIGS. 5A and 5B, when the system is initiated (STEP 501), a signal from a sensor which signal indicating the state of each plant portion to be monitored is periodically fetched, translated into a digital value and converted in the engineering unit value, whereupon the resulting value is stored in the plant database 31, like the plant database 701 shown in FIG. 7. The inference processing mechanism 33 perform an inference according to the knowledge base 32 to discriminate the occurrence of the abnormality, with normally influencing thereon a plant current value from the plant database 31 (STEPS 502 and 503). In this inference, data in the plant database 31 are linked with knowledge of the knowledge base 32 by using the mapping table 33a.

The result of inference is stored in the inference result storing means 34. This inference is displayed on the CRT display screen of the display inputting means 4, as shown in FIG. 3A, by the display processing means 35, thereby being presented to an operator.

Now assuming that an abnormality occurred, namely, that MS001 (degree of vacuum) is 660 mmHg, for example, as shown in FIG. 7, the antecedent of MS001 in the knowledge base 703 will be:

IF MS001<680 mmHg so that the postulate is selected.

In response to this, the inference processing mechanism 33 transmits to the display processing means 35 data indicating the occurrence of the abnormality. Upon receipt of this data, the display processing means 35 displays the occurrence of the abnormality on the display screen of the display inputting means 4 (STEP 504). At the same time an alarm sound also may be issued.

Further, the inference processing mechanism 33 retrieves, with using the managing number (here the input point number) indicating the abnormal event as a key, the relevant fault tree in the fault tree group stored in the knowledge base 32, and stores the relevant fault tree in the inference result storing means 34 (STEP 505).

During that time, since the fault tree group is stored in the auxiliary storage 303 as shown in FIG. 6, the relevant fault tree is transmitted to the inference result storing means 34 formed on the main storage 302. Preferably, the detailed data about each event constituting the selected fault tree also may be stored in the inference result storing means 34.

Then an inspection is made on whether there is an operator's request for displaying the tree; in the absence of the operator's request, the routine is returned to STEP 502 to continue monitoring (STEP 506).

In the presence of the operator's request, display processing of the fault tree is performed as described below (STEP 507). The operator's request for display can be performed by setting a soft key on the display screen and then making a designation by touching the touch panel 307.

The input of the display request should by no means be limited to this example and may alternatively be done by a command from the input unit 305 or by depressing a private key of the input unit. In the absence of an designation, it may be automatically switched over to displaying the fault tree.

The fault tree display process is performed, for example, as shown in FIG. 5B.

Firstly, the display processing means 35 displays on the display screen of the display inputting means 4 the fault tree stored in the inference result storing means 34 (STEP 510). The display screen shown in FIG. 1 shows an example in which an abnormality "DEGREE OF VACUUM OF CONDENSER:LOW" occurred.

In this circumstances, an operator investigates the cause of the abnormality. In this case, the fault tree lists firstly some causes of the abnormality "DEGREE OF VACUUM OF CONDENSER: LOW" and then some causes for each event, and so forth, progressively focusing the cause.

At that time, regarding the fault tree event, its details such as the formula of definition and the guidance message would occasionally be needed.

When the operator designates a special event block 110 in the fault tree 101 of FIG. 1 by the touch panel 307, this designation is translated into a digital signal by the touch input unit 308, and the digital signal is transmitted to the touch-sensitive processing means 36.

The touch-sensitive processing means 36 translates this digital signal into an address signal and transmits the address signal to the display processing means 35. The display processing means 35 identifys, based on the accepted address, as to which soft key's designation the address signal is (STEP 511). This identification is made by preparing a table in which addresses are previously defined one for each soft key.

The display processing means 35 then discriminates whether it is an event block designation or a display screen scroll designation (STEP 512).

In case of the scroll designation, scroll processing is performed (STEP 520).

In case of the designation for the tree event block 110, the display processing means 35 translates this address into a managing number of the event block, and retrieves, by using the obtained managing number as a key, detailed data stored in the inference result storing means 34, and fetches the detailed data corresponding to the touched event block (STEP 513). This translation can be performed by previously preparing a table in which an address accepted by touching is contrasted with a managing number for every event.

Further, the display processing means 35 detects an area in which no fault tree is disposed in the display inputting means 4, and decides the position in which a window is to be displayed. At this position, the window 102 is set, and the fetched detailed data/such as the guidance message is displayed. Also, the display processing means 35 may display guidance message window at predetermined position (STEP 514).

Then, in this embodiment, especially in the absence of a designation, firstly the formula of definition among the detailed data is displayed. For displaying the remaining contents, the operator makes a designation on a soft key, i.e. the selection designating portion 104, on the display screen to switch the content of display with the window 102.

Subsequently, by using a soft key of the touch-sensitive panel 307, an inspection is made as to whether displaying of the remaining content such as "guidance" is requested (STEP 515). If it is not requested, the routine is returned to STEP 511.

If it is requested, the request is checked, and it is detected as to which key is touched. If it is the key of the selection designating portion 104, its associated function is detected (STEP 516). This is done by previously preparing a table in which an individual position is associated with a command address storing the relevant content of designation for every key of the selection designating portion 104 and by interpreting, according to the detected position, the command stored in the designated address.

The display processing means 35 retrieves, according to the designation, the designated content, e.g. a guidance message from the detailed data stored in the inference result storing means 34, and fetches the guidance to display it in the window 102 (STEP 517). Thus, the displayprocessing means 35 displays the data corresponding to the soft key.

In the presence of an additional touch, a discrimination is made as to which area is touched. If the touched area is the window 102, the presently displayed window 102 is erased (STEPS 518 and 519). If the touched area is outside the window 102, the routine is returned to STEP 511, whereupon the individual process is performed according to the content of the soft key of the touched area.

With the display in the window, when another event block is designated, detailed data concerning a newly selected event is displayed within the window 102.

Thus according to this embodiment, it is possible to designate the event block located at the display position simply when an operator touches that display position on the display screen, so that the detailed data concerning it can be obtained by the display in window. In addition, the content of the detailed data can be designated by the soft key located on the same display screen so that this embodiment does not require laborious operation such as switching the display screen.

A second embodiment adopting the fault tree displaying method of this invention will now be described. This embodiment is a method in which reediting is performed so as to constitute a fault tree only by the abnormal course or path for displaying.

This embodiment and a further embodiment described below are examples in which the principles of this invention are used in the plant diagnosis support system similar to the foregoing embodiment. Consequently, any overlapping of description is omitted here for clarity. This invention should by no means be limited to a plant diagnosis support system.

Figure 8:
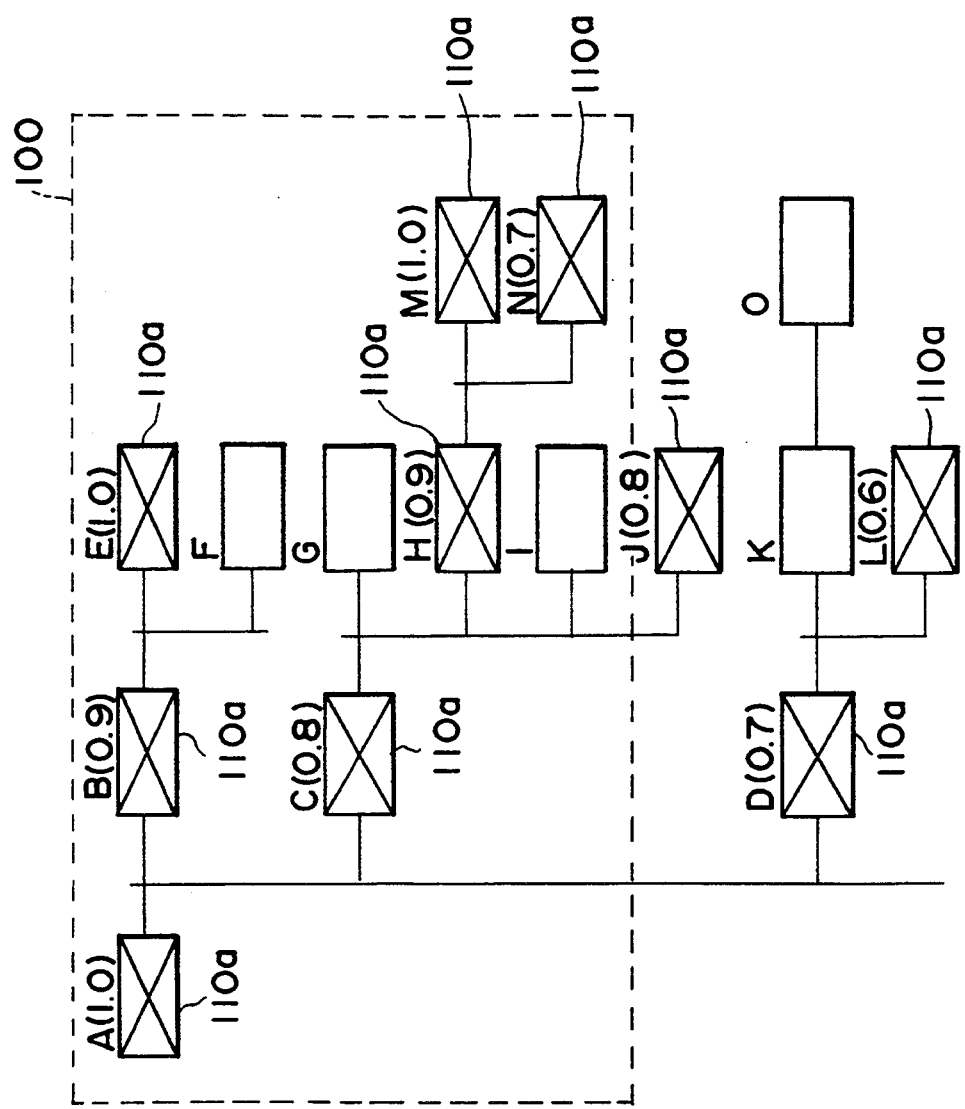
FIG. 8 shows the relationship between a fault tree and the display screen size.

In general, assuming that a fault tree is not easy to display within one display screen, for example, the range of one display screen is defined by dotted lines as shown in FIG. 8, only a part of the tree can be displayed so that any possible event of abnormality might happen to have not been displayed. To the contrary, in the prior art, the display screen must be switched in order to observe another abnormal course or path. Assuming that it is displayed on a reduced scale, since many normal courses or paths also are displayed, it is difficult to find out the abnormal portion.

In this embodiment, a threshold of the degree of abnormality is previously determined for every event, the degree of abnormality that exceeds the threshold of each event is selected, according to which a fault tree is reedited.

Specifically, as shown in FIG. 6, an influenced route including the event of abnormality is fetched and is displayed on the CRT display 306.

The editing at that time will now be described in greater detail.

In making an inference concerning data from the plant database 31 by using the knowledge base 32, the inference processing mechanism 33 calculates the degree of an abnormality, if it is found out. This calculation can be done based on the data such as a previously prepared fuzzy set, which is previously stored in the knowledge base 32.

In FIG. 8, each event block 110a with a symbol X within the block frame is the event block in which an abnormality was detected; each figure in parentheses is the degree of abnormality to be calculated. The degree of abnormality is stored in association with an event managing number for each event.

Figure 9:
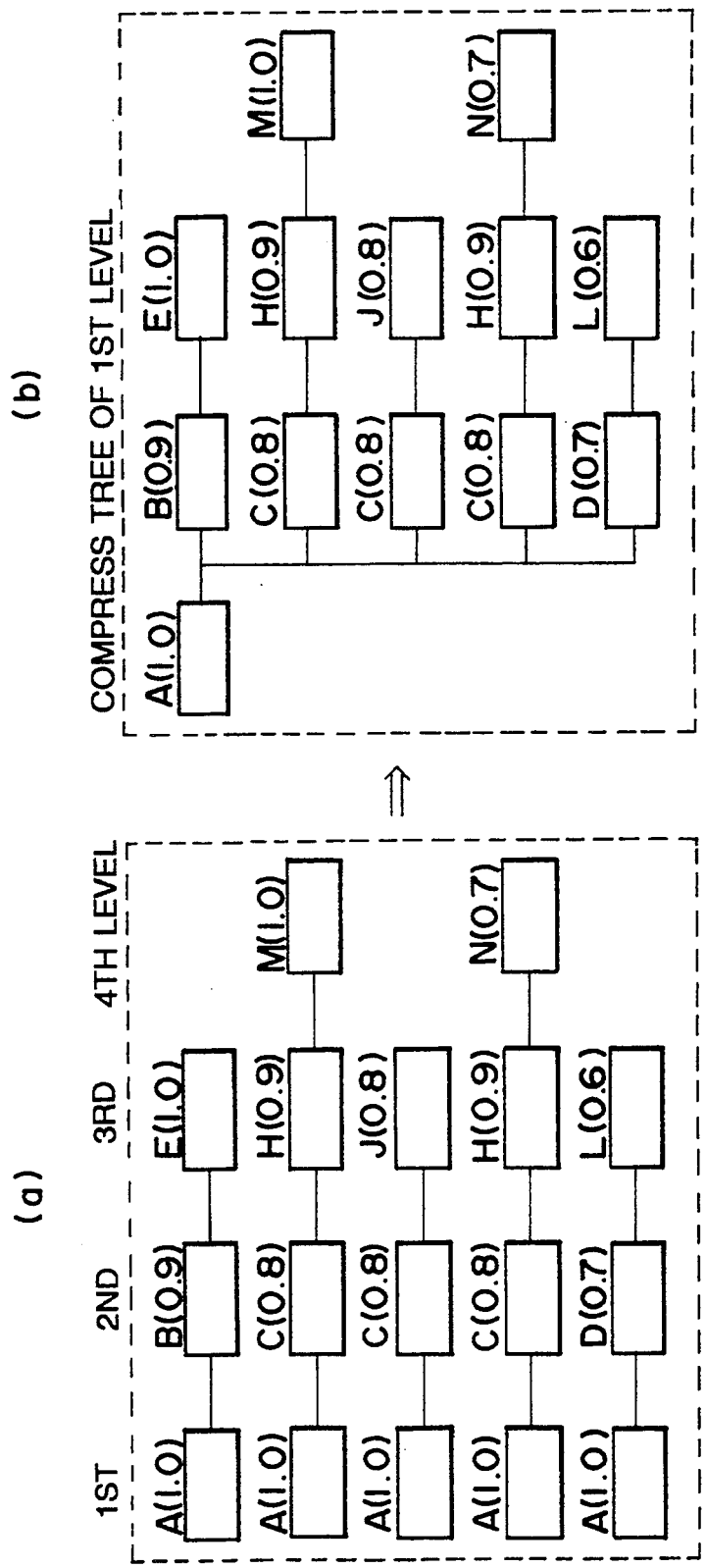
FIG. 9 shows the manner in which a fault tree at the first level is edited.

The display processing means 34 compares the degree of abnormality, which is stored in a table, with a preset threshold and detects the degree of abnormality that exceeds the preset threshold. As shown in FIG. 9(a), these events are hierarchically classified and are arranged in the order of degree of abnormality from higher to lower.

Then, retrieving of blocks equal in events are performed from the first level to the fourth level, and the thus retrieved blocks are put together as shown in FIG. 9(b). Now, since all of the first level blocks are labelled with A, only abnormal parts constitute blanches connected to this block A are collected to constitute an alarm tree.

Figure 10:
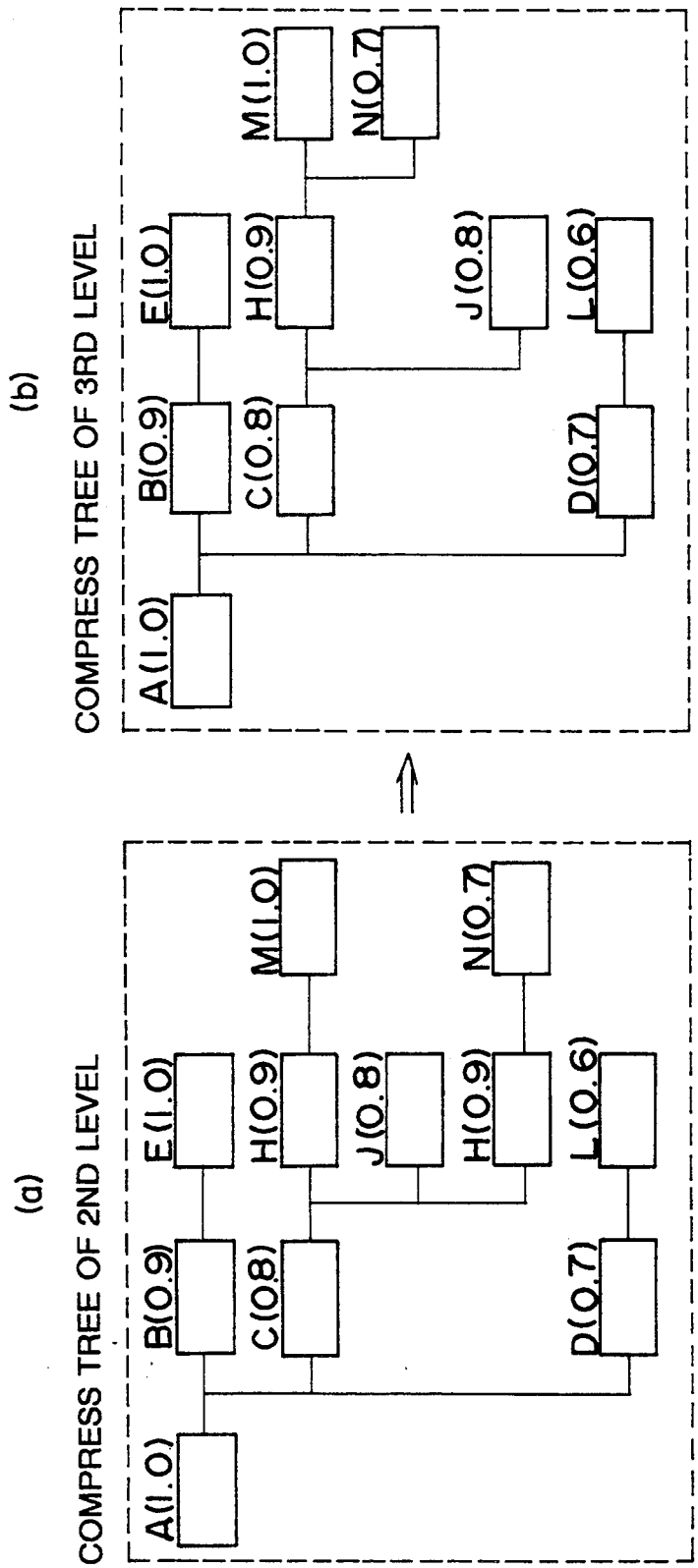
FIG. 10 shows the manner in which a fault tree at the second and third levels is to be edited.
Figure 11:
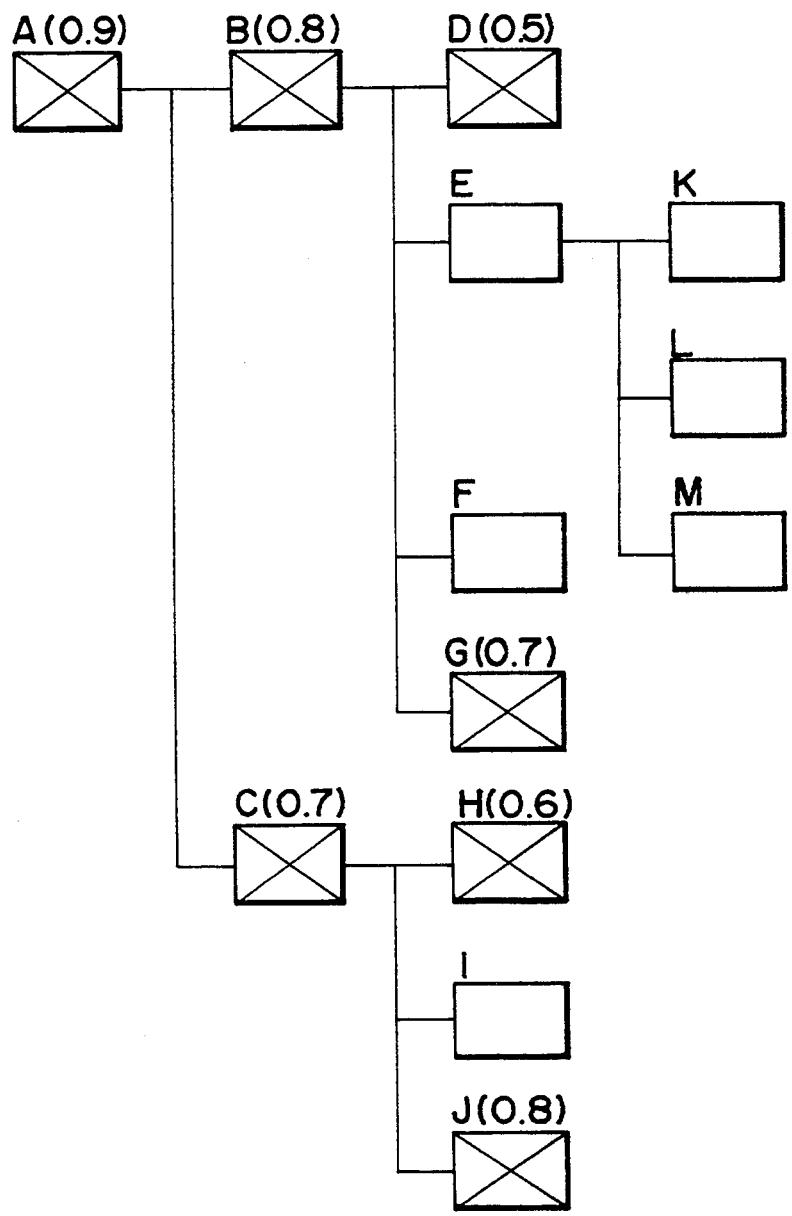
FIG. 11 shows the entire original fault tree.

Further, the display processing means 34 compresses the tree at the second and third levels, thus showing the events. Specifically, the blocks equal in the events at the second level are put together; as shown in FIG. 10(a), here the blocks labelled with C are put together. For the third level, as shown in FIG. 10(b), the blocks labelled with H are put together.

Thus, the number of the events displayed is compressed by collecting only the necessary events and by putting together the connections of the course for every common event. As a result, a summary of alarm tree is prominently displayed within one display screen.

It should be noted that the order of course is altered here. Specifically, in the order of the degree of vacuum, the degree of vacuum of the course A-C-J is higher than that of the course A-C-H-N. However, since the identical events are displayed at two separate positions remote from each other as shown in FIG. 10(a), it might be laborious to investigate the cause. To this end, comparison on the degree of abnormality for every upper level is made, whereupon the course is obtained as shown in FIG. 10(b).

Since the identical events are displayed always in a lot, an operator can trace the course of abnormality quickly and surely during emergency.

The operation of the system according to this embodiment may be automatically performed. Alternatively, the operation may be performed by the soft key's designation set on the display screen. For example, in the selection designating portion 104 shown in FIG. 1, initiation of functions of the system may be done by designating "summary".

Figure 12:
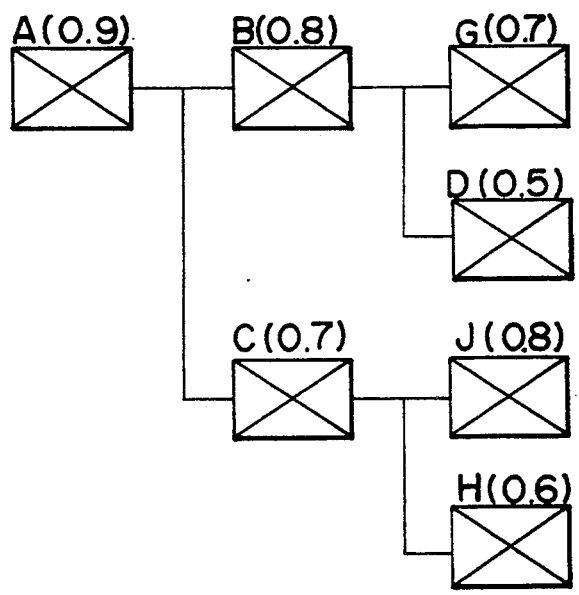
FIG. 12 shows a summary of alarm trees.
Figure 13:
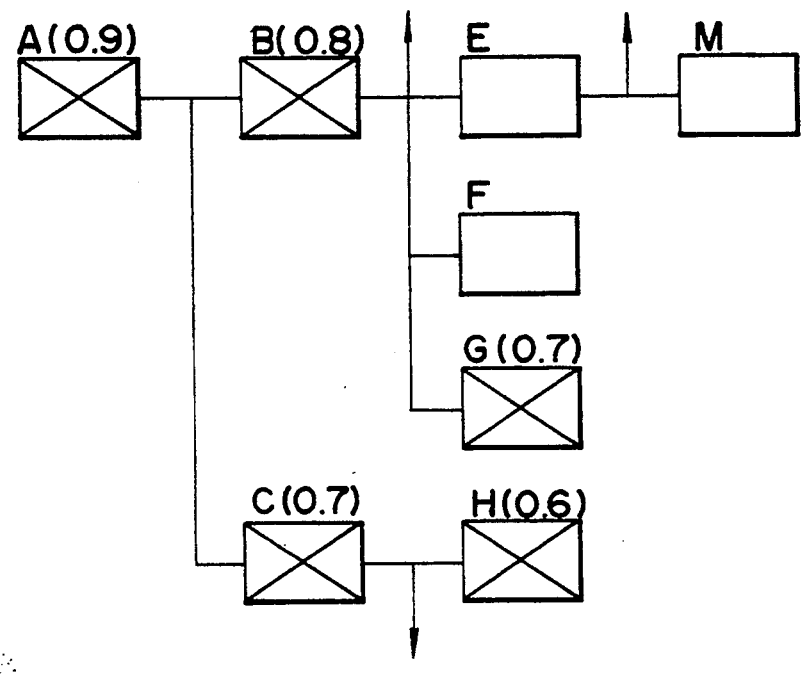
FIG. 13 shows a fault tree structure edited so as to locate a particular event at the center of the display screen and so as to arrange its related events around the particular event.

Further, as shown in FIGS. 12 and 13, without reediting, the degree of abnormality may be displayed near the associated event and may be updated so as to correspond to the status of the plant, so that the place of abnormality or its course can be grasped with ease. In an alternative way, the events exceeding the threshold may be displayed in a different color such as red.

A third embodiment of this invention will now be described. This embodiment relates to a man-machine system in displaying an alarm fault tree.

The above-mentioned alarm tree is a tree in which events of abnormality have been selected from a plurality of abnormality-affected route occurred in the present fault tree and which has been reconstructed by compression and editing. When monitoring a plant, it is important to recognize the entire construction concerning one abnormality-affected route from this alarm tree, namely, to note the positional relationship of the abnormality-affected route in the present fault tree.

In this embodiment, by displaying the abnormality-affected route in the present fault tree, it is possible to achieve a precise grip of the status of operation of a plant with ease, and hence it is possible to take a proper measure. Namely, an operator makes reedition such that the worth-notice event block is located vertically centrally of the display screen.

This function is performed as an operator makes a designation concerning the worth-notice event block by means of a touch-sensitive panel, etc. and inputs a command to instruct for performance of the function. This instruction for performance of the function may be done by a soft key.

As a result, the routine of this function would be identical with that of the foregoing embodiment. On the other hand, if the event blocks A and B are located centrally, the event block G would overflow from the display screen. Since a fault tree has a pyramid shape, in which the higher the level, the less the number of events for each level, the lower events (i.e., the lowermost events within the displayed area and not the lowermost events on the affected route) in the display are positioned centrally of the displayed area, and the upper events are shifted into the displayed area, thus realizing the display of the optimum positional relationship and relevant information.

For example, in the affected route A-B-G, since the lower event within the display is the event G, the event G is located centrally of the displayed area, and the upper events A, B are moved with respect to the original fault tree to an upper position of the displayed area, and the remaining events around the event G are located in the same arrangement as that of the original fault tree. Thus the position and relationship in the original fault tree concerning the affected route A-B-G can be obtained as shown in FIG. 13.

A fourth embodiment of this invention will now be described. This embodiment relates to scrolling of display.

When a display screen is scrolled, a part of the event blocks which had been existing on the screen by that time might overflow from the display screen. In case of such overflow, the entire construction of the tree cannot be seen. To prevent this overflow, in this embodiment, like the previous embodiments, the relation of connection of the tree can be kept by rearranging the events.

In this embodiment, when an operator makes a touch on the scroll designating portion 105, an identification is made as to the touched area (STEP 511), as shown in FIG. 5B. In the presence of the designation on the scroll designating portion 105, the routine is shifted (STEP 512) to perform scrolling (STEP 520).

In response to this scrolling, the display processing means 35 stores in the main storage 302 the content of display concerning the event that will overflow from the screen.

Now a decision is made, in conformity with the hierarchy of the events, as to which event is to be stored, namely, as to which event is to be displayed after scrolling. Namely, with the lowermost event at the uppermost position of the display screen as a reference, among event blocks constituting the same affected route connected to this lowermost event, some located upwardly of the reference event block in the display screen would overflow from the screen. So these overflown events are stored.

After scrolling, the tree, i.e., the event blocks, which have been to newly enter the display screen, as well as the stored event blocks are reconstructed and displayed.

A fifth embodiment of this invention will be described in greater detail with reference to FIG. 14.

In this embodiment, the lower events within the display are scrolled, and the upper events are moved and arranged, thereby realizing the optimum tree display with maintaining the upper-vs-lower relationship.

Figure 14:
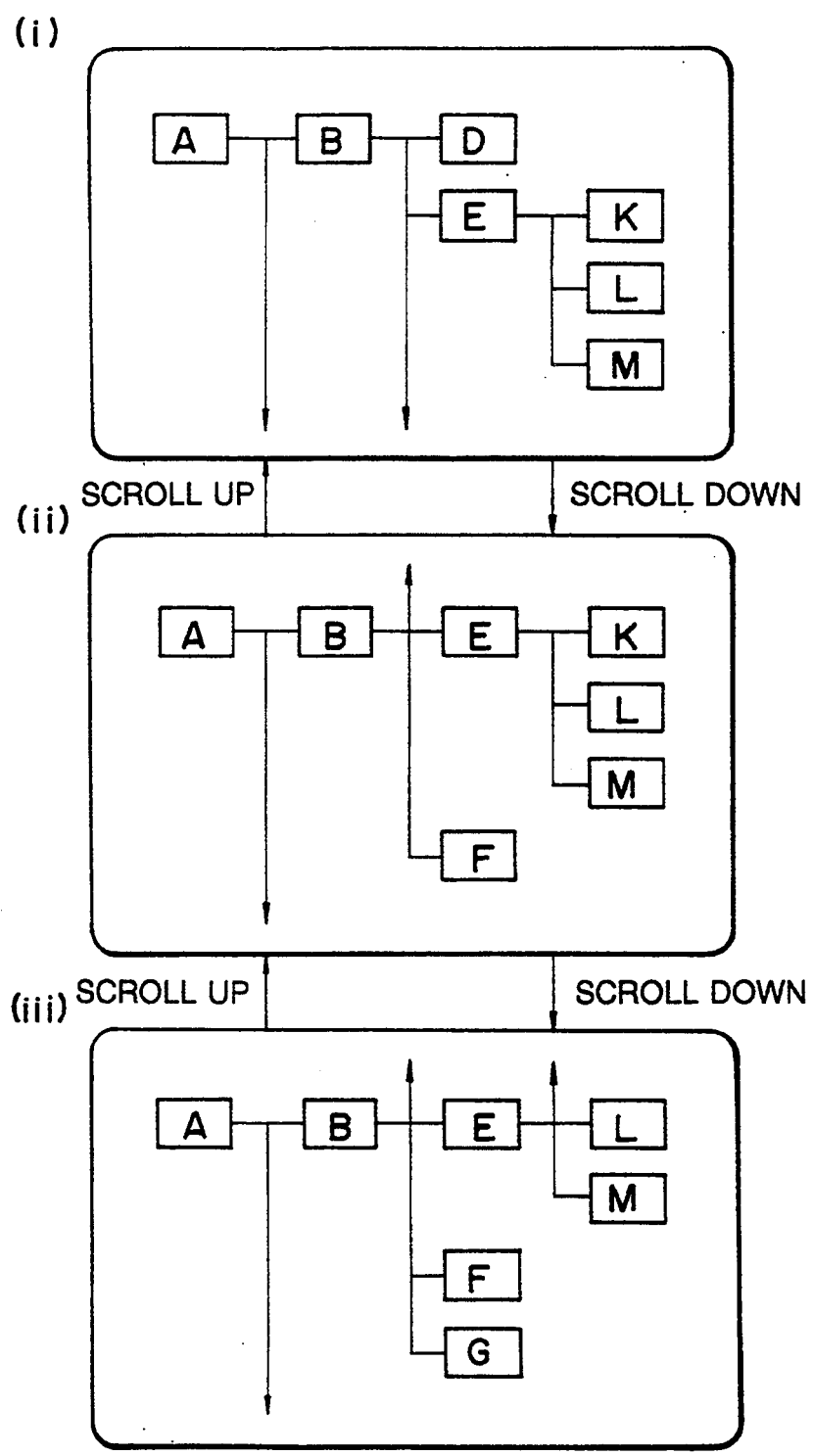
FIG. 14 shows the manner in which a fault tree on the display screen is edited when scrolling is performed.

For example, in FIG. 14, in scrolling up the screen (i), the lower event K within the display screen is allocated to an upper right portion of the displayed area, and the upper events A, B and E are moved with respect to the event K and are then arranged. As a result, the scrolled screen (ii) shown in FIG. 14 is obtained.

Likewise, in further scrolling up the screen (ii), the event L is allocated to an upper right portion of the displayed area, and the scrolled screen (iii) shown in FIG. 14 is obtained.

In the foregoing description, the events in the display screen are scrolled up with respect to the reference event. Alternatively, the events may be scrolled down with respect to the reference event.

According to this embodiment, even when the fault tree displayed on the display screen is scrolled on the screen, the relevant events remains, without overflowing from the display screen. Therefore, the needed events can be recognized without repeated scrolling, so that the display is easy to see.

In this embodiment, the upper event blocks remains on the screen. However, this invention should by no means be limited to this example. For example, even if they are the lower events, a special event, a event group or an affected route may always remain on the screen during scrolling. In this case, the events to be left in the screen are designated by means of a touch-sensitive panel, etc.

In each of the foregoing embodiments, for switching the display screen to the display of other data to be monitored, the system restores the normal plant monitoring mode from the fault tree displaying mode, by inputting a command from a soft key or an input unit, though not shown in FIG. 5B.

Further, in each of the foregoing embodiments, this invention is adopted to a plant diagnosis support system for a power plant. However, this invention should by no means be limited to the illustrated example and may be widely used in a system for assisting in diagnosing the status of a different plant or process.

The foregoing embodiments may be individually incorporated in a diagnosis support system. Also, one or more of the foregoing embodiments may be incorporated in the system in combination.

In addition, in making a designation for display on the screen, instead of the touch-sensitive panel, various kinds of input means such as a mouse or keyboard may be used. Also a designation may be inputted by voice.

Alternatively, each of the foregoing embodiments may be widely used in investing the cause of abnormality by using a fault tree.

As discussed above, according to this invention, when referring the detailed data concerning each event of a fault tree, it is possible to refer each event together with the fault tree, without switching over the display screen, which is convenient.

Further, according to this invention, even if it is a large-scale fault tree, every needed event can be recognized at a glance without switching over the display screen, thus preventing any misjudgment. Still further, the events concerning the worth-notice event can be arranged on the display screen, and even during scrolling, it is possible to prevent the relevant events from overflowing from the display screen, so that the display can be seen prominently.

What is claimed is:

1. A method for displaying a fault tree on a display screen, comprising the steps of:
    (a) providing detailed data relevant and corresponding to respective events of a fault tree to be displayed on a display screen;
    (b) displaying events in an upper portion of said fault tree on a left-side portion of said display screen;
    (c) displaying events in a lower portion of said fault tree on a right-side portion of said display screen; and (d) displaying, upon receipt of a designation for at least one of the events, in a window its relevant and corresponding detailed data on the left-side portion of said display screen in a remaining area thereof so as not to interfere with observation of the fault tree.

2. A method for displaying a fault tree on a display screen, comprising:
   (a) indicating a degree of abnormality obtained for each of various possible events by a value, comparing said value with a predetermined value, and then selecting one or more events whose degree of abnormality exceeds said predetermined value;
   (b) constituting a new fault tree by the selected events; and
   (c) displaying the new fault tree on the display screen.

3. A method for displaying a fault tree on a display screen, comprising:
   (a) constituting a tree structure from blocks representing each of various possible events of said fault tree, and lines connecting said blocks hierarchically, and displaying said tree structure on said display screen; and
   (b) indicating a degree of abnormality obtained for each of various possible events by a value, and displaying said value along with each of said blocks corresponding thereto respectively on said display screen.

4. A method for displaying a fault tree on a display screen, comprising:
   (a) displaying blocks indicating each of various possible events of said fault tree and lines connecting therebetween in a tree structure;
   (b) comparing a degree of abnormality obtained for each of various possible events with a predetermined value, and selecting one or more events whose degree of abnormality exceeds said predetermined value; and
   (c) displaying the block for the selected event in a color different from the remaining blocks.

5. A method for displaying a fault tree of various events on a display screen, comprising:
   (a) storing in a storage means the content of display concerning one or more events which will overflow from the display screen when scrolling is performed in connection with the fault tree displayed on the display screen;
   (b) reconstituting, after scrolling, the fault tree by including the stored events; and
   (c) displaying the reconstituted fault tree.

6. A method for displaying a fault tree of various events on a display screen, comprising the steps of:
   (a) locating a particular event of the fault tree centrally of its associated hierarchy on the display screen in response to an indication that the particular event occurred; and
   (b) arranging other peripheral events related to the particular event around the particular event.

7. A process diagnosis support system comprising:
   (a) a database in which signals from a process are stored;
   (b) a knowledge base in which knowledge including a fault tree and to be used in inferring is stored;
   (c) an inference processor for performing an inference including monitoring the process and retrieving the fault tree by using said database and knowledge base;
   (d) an inference result storage for storing the result of the inference;
   (e) a display processor for displaying the result of the inference on a display screen of a display; and
   (f) at least one of the following functions:
      (i) a first function of providing detailed data relevant and corresponding to respective possible events of a fault tree to be displayed on a display screen, and displaying, upon receipt of a designation for at least one of the events, in a window its relevant and corresponding detailed data on the display screen in a remaining area thereof so as not to interfere with observation of the fault tree;
      (ii) a second function of comparing a degree of abnormality obtained for each of various possible events with a predetermined value, selecting one or more events whose degree of abnormality exceeds said predetermined value, constituting a new fault tree by the selected event or events and displaying said fault tree on said display screen;
      (iii) a third function of storing in a storage the content of a display concerning one or more events which will overflow from the display screen when scrolling is performed in connection with the fault tree displayed on the display screen, reconstituting, after scrolling, the fault tree by including the stored events, and displaying the reconstituted fault tree; and
      (iv) locating a particular event centrally of its associated hierarchy on the display screen and arranging other peripheral events around the particular event.

8. A fault tree displaying method according to claim 1, wherein the designation in connection with the events displayed on the display screen is received via a touch-sensitive panel.

9. A fault tree displaying method according to claim 1, wherein the designation in connection with the events displayed on the display screen is received via a mouse.

10. A process diagnosis support system according to claim 5, wherein the designation in connection with the events displayed on the display screen is received via a touch-sensitive panel.

11. A process diagnosis support system according to claim 5, wherein the designation in connection with the events displayed on the display screen is received via a mouse.

12. A method for displaying a fault tree on a display screen, comprising the steps of:
   (a) comparing a degree of abnormality for each of various possible events of a fault tree with a predetermined value and selecting one or more events whose degree of abnormality exceeds said predetermined value;
   (b) constituting a fault tree corresponding to the selected events;
   (c) displaying the fault tree on the display screen;
   (d) storing in a storage the content of a display concerning one or more events which will overflow from the display screen when scrolling is performed in connection with the fault tree displayed on the display screen;
   (e) reconstituting, after scrolling, the fault tree by including the stored events;
   (f) displaying the reconstituted fault tree;
   (g) providing detailed data relevant and corresponding to respective events of a fault tree to be displayed on a display screen;

(h) displaying events in an upper portion of said fault tree on a left-side portion of said display screen;

(i) displaying events in a lower portion of said fault tree on a right-side portion of said display screen; and (j) displaying, upon receipt of a designation for at least one of the events, in a window its relevant and corresponding detailed data on the left-side portion of said display screen in a remaining area thereof so as not to interfere with observation of the fault tree.

13. A process diagnosis support system comprising:

(a) a database in which signals from a process are stored;

(b) a knowledge base in which knowledge including a fault tree and to be used in inferring is stored;

(c) an inference processor for performing an inference including monitoring the process and retrieving the fault tree by using said database and knowledge base;

(d) an inference result storage for storing the result of the inference;

(e) a display processor for displaying the result of the inference on a display screen of a display; and (f) at least one of the following functions:

(i) a first function of providing detailed data relevant and corresponding to respective possible events of a fault tree to be displayed on a display screen, and displaying, upon receipt of a designation for at least one of the events, in a window its relevant and corresponding detailed data on the display screen in a remaining area thereof so as not to interfere with observation of the fault tree;

(ii) a second function of storing in a storage the content of a display concerning one or more events which will overflow from the display screen when scrolling is performed in connection with the fault tree displayed on the display screen, reconstituting, after scrolling, the fault tree by including the stored events, and displaying the reconstituted fault tree; and (iii) locating a particular event centrally of its associated hierarchy on the display screen and arranging other peripheral events around the particular event.

* * * * *